United States Patent [19]
Renner et al.

[11] Patent Number: 5,173,789
[45] Date of Patent: Dec. 22, 1992

[54] IMAGE SCANNER INCORPORATING MANUALLY OPERABLE MAGNIFICATION AND BRIGHTNESS CONTROL

[75] Inventors: Meinrad Renner, Esslingen, Fed. Rep. of Germany; Paul R. Shelley; Kenneth A. Parulski, both of Rochester, N.Y.

[73] Assignee: Eastman Kodak Company, Rochester, N.Y.

[21] Appl. No.: 732,292

[22] Filed: Jul. 18, 1991

[51] Int. Cl.$^5$ ................................................ H04N 1/04
[52] U.S. Cl. .................................... 358/475; 358/473
[58] Field of Search ........ 358/473, 475, 486, 214–216; 382/59

[56] References Cited

U.S. PATENT DOCUMENTS

| | | | |
|---|---|---|---|
| 3,993,865 | 11/1976 | Browne et al. | 178/7.6 |
| 4,581,761 | 4/1986 | Ichinokawa et al. | 382/13 |
| 4,901,364 | 2/1990 | Foulkerson et al. | 382/59 |
| 4,922,350 | 5/1990 | Rombola et al. | 358/486 |
| 4,954,914 | 9/1990 | Karita et al. | 358/475 |
| 4,961,117 | 10/1990 | Rumley | 358/475 |
| 5,038,224 | 8/1991 | Martulli et al. | 358/475 |

Primary Examiner—Stephen Brinich
Attorney, Agent, or Firm—David M. Woods

[57] ABSTRACT

A scanner useful as an input device to a television or like display is operable while manually zooming and cropping the image projected onto an image sensor. A fixed image is supported on a movable, hand-manipulated stage that interactively controls the conjugate distances of the optical system so that zooming and cropping is obtained without losing focus. Since zooming the image affects the level of illumination impinging upon the sensor, an automatic brightness circuit varies the illumination according to the signal level. A manually operated altering circuit allows additional user-selected variation of the illumination level. By situating manually operated altering switches on the movable stage, a single hand can control zooming, cropping and brightness without having to interact with a keyboard or like input controls on the display.

10 Claims, 6 Drawing Sheets

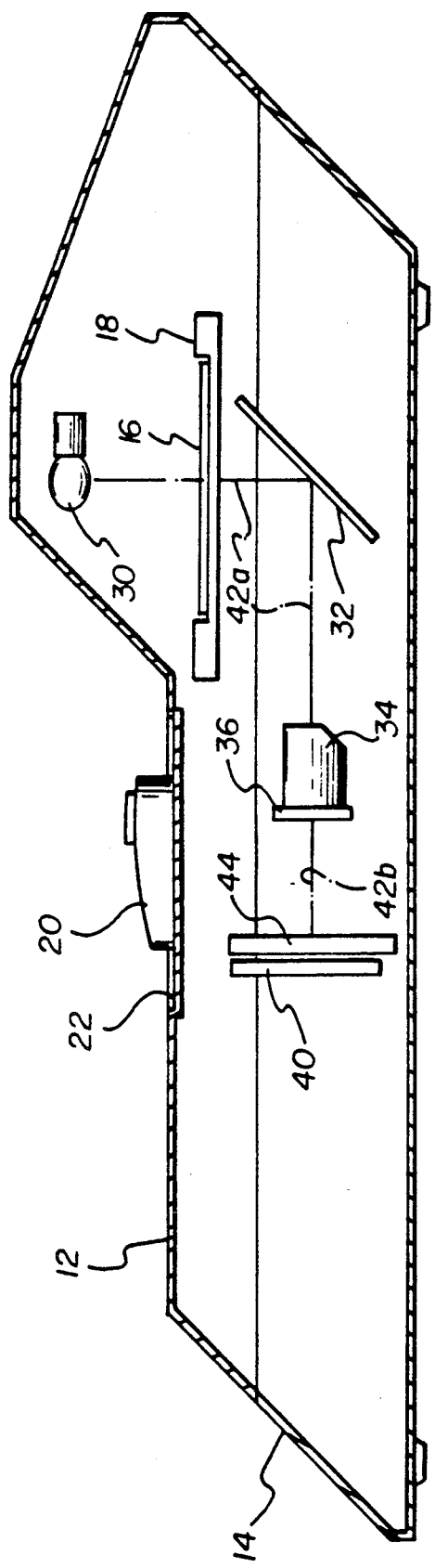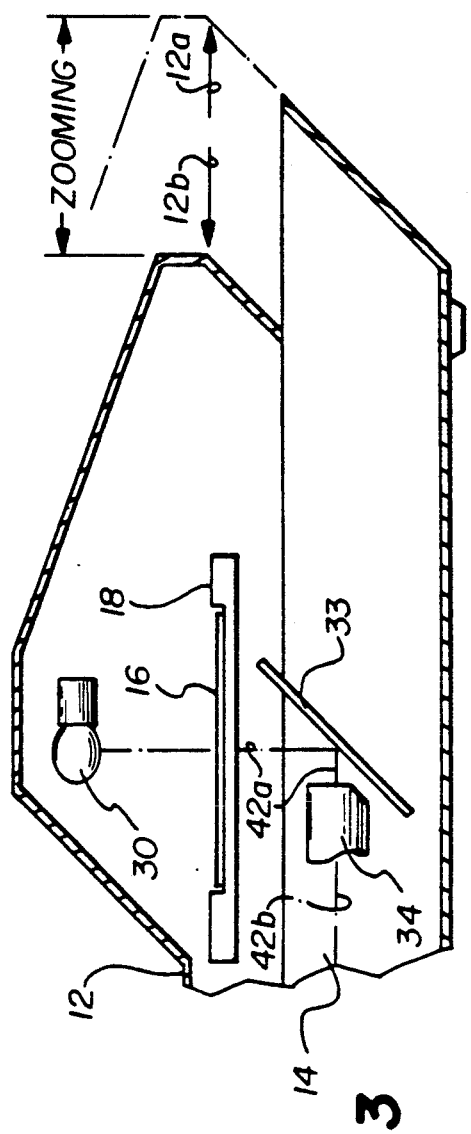
FIG. 2
FIG. 3

IMAGE SCANNER INCORPORATING MANUALLY OPERABLE MAGNIFICATION AND BRIGHTNESS CONTROL

BACKGROUND OF THE INVENTION

1. Field of the Invention

This invention pertains to the field of manually-operated film scanning devices, and, in particular, to the illumination of a manually operated film scanner used as an input device to a television or like display.

2. Background Art

Manual image scanners are well known devices for inputting textual and pictorial information to a computer. U.S. Pat. No. 4,581,761 describes a typical ergonomically-designed housing including a linear sensor that is manually dragged by the hand of a human operator (hereinafter referred to as the "user") across the text or pictorial copy. A pressure sensitive switch on the bottom of the scanner turns the unit on when the user forces the scanner against the copy, and turns the unit off when the depression force is removed. Additional functions, such as variation of the enlargement or reduction ratio, may be engaged by keys on the top surface of the scanner. Notwithstanding such functionality, the scanner operates in but one scanning mode, that is, it inputs scanned data when the bottom switch is depressed and the linear sensor is swept across the copy. (U.S. Pat. No. 4,901,364 shows another example of a scanner capable of multi-functional operation, but only one scan capability.) If playback of the scan is needed, e.g., to evaluate the pictorial information, either the computer has to collect the linear scan data for a complete raster, or, as shown in U.S. Pat. No. 3,993,865, an intermediate store is provided for first collecting data from the manual scanner at a variable rate dependent on hand motion and then repetitively reading out the data at a constant rate for television viewing.

With each of the aforementioned scanners, it is necessary to provide some form of illumination. In U.S. Pat. No. 4,581,761, an optical system in the scanner includes an LED lamp array for irradiating light onto the paper being copied. In U.S. Pat. No. 3,993,865, the intermediate store also functions as a control unit, in particular providing an on/off brightness control. In U.S. Pat. No. 4,901,364, a hand-held character scanner includes user-programmable function keys and a light source comprising two LED devices. The turn-on time of the two LED devices is adjusted (presumably by the user) as a function of the reflective characteristics of the medium. In effect, the LED devices are driven on and off at a rapid repetition rate, thus forming a stroboscopic light source illuminating the medium surface bearing the characters.

Apart from the realm of hand-manipulated scanners, relatively larger desk-top scanners are available for high resolution scanning of slides or negatives in color or black-and white. An example is the 35 mm Rapid Film Scanner manufactured and sold by Eastman Kodak Company, Rochester, N.Y., which accommodates a functionally more complex illumination control than the aforementioned scanners. This scanner performs a color sequential high resolution area scan (1,312×1,024 pixel area) of color images in 18 seconds for input to a Macintosh® computer. Besides performing optical zooming panning, and cropping, the Rapid Film Scanner has a mode in which the image can be viewed either in monochrome or in color. The user selects the mode via a pull-down menu on the computer. Composing the image in color is difficult, however, because of the slow screen update rate due to the need to sequentially capture three color separations by rotating a filter wheel, and due to the color fringes which appear if the film image is moved while the separations are scanned. As a result, image composition is normally done in the monochrome mode.

Illumination in the Rapid Film Scanner is provided by a xenon flash lamp, and the amount of light is determined by the number of flashes per image scan. In turn, the number of flashes is determined from either an autobalance procedure or a manual balance mode. When the autobalance procedure is selected, the scanner computes the average brightness from the highest and lowest signal values from the last scan. The average brightness value is then used to adjust the number of flashes for the next succeeding scan. To adjust the illumination manually, the user pulls down the computer menu, and selects the manual balance mode. Then a computer mouse is used to move screen-based "sliders" which vary either the overall brightness or the brightness separately in the red, green and blue channels. Alternatively, the exact number of light flashes can be entered into the keyboard. To then examine the adjusted image in color, the user must pull down the computer menu, and select the color mode. Once the color image is captured, the user must pull down the menu again, in order to return to the monochrome mode, and compose the next image. This means, particularly for manual adjustment of the illumination, that the user must continuously switch from handling the scanner to handling the computer pointer, typically by manipulating a mouse. This is a tolerable situation for user scanning of only a few images, as is typically the case in applications where such a scanner is used. It is less acceptable in the case where real-time interactive image input is desired.

SUMMARY OF THE INVENTION

An object of the invention is to provide interactive control of the illumination from a small, hand-manipulated film scanner connected to a display device so that the user can properly illuminate the image on the display screen without resorting to the controls connected to the display device.

Another object of the invention is to allow the user to rapidly input images into a display by interacting only with the hand-manipulated film scanner, specifically not requiring interactions through a computer keyboard or cursor-driven menu selections on a display screen.

Another object of the invention is to provide automatic illumination control with additional means on the hand-manipulated scanner for altering the automatic illumination control to thereby manually vary the illumination level without requiring interaction with a host computer or display device.

Another object of the invention is to allow all of the controls to be congregated on the scanner so that a simple television display (without special controls) can be used.

A user-manipulated scanner according to the invention includes sensing means for providing an image signal from a fixed image, means for illuminating the fixed image, optical means for directing image light along a light path toward the sensor, and magnification means for varying the optical path length to obtain the effect of zooming. Illumination is either automatically controlled, particularly during zooming, or manually operable means are engaged for altering the automatic control to accordingly allow additional variation of the illumination level. In the preferred embodiment, the fixed image is a film transparency.

BRIEF DESCRIPTION OF THE DRAWINGS

The invention will be described in relation to the drawings, in which:

FIG. 2 is a side elevation of the scanner shown in FIG. 1, as simplified to show the main components of the optical system;

FIG. 3 is a partial side elevation of the scanner shown in FIG. 1 further simplified to show zooming movement;

DESCRIPTION OF THE PREFERRED EMBODIMENT

Figure 1:
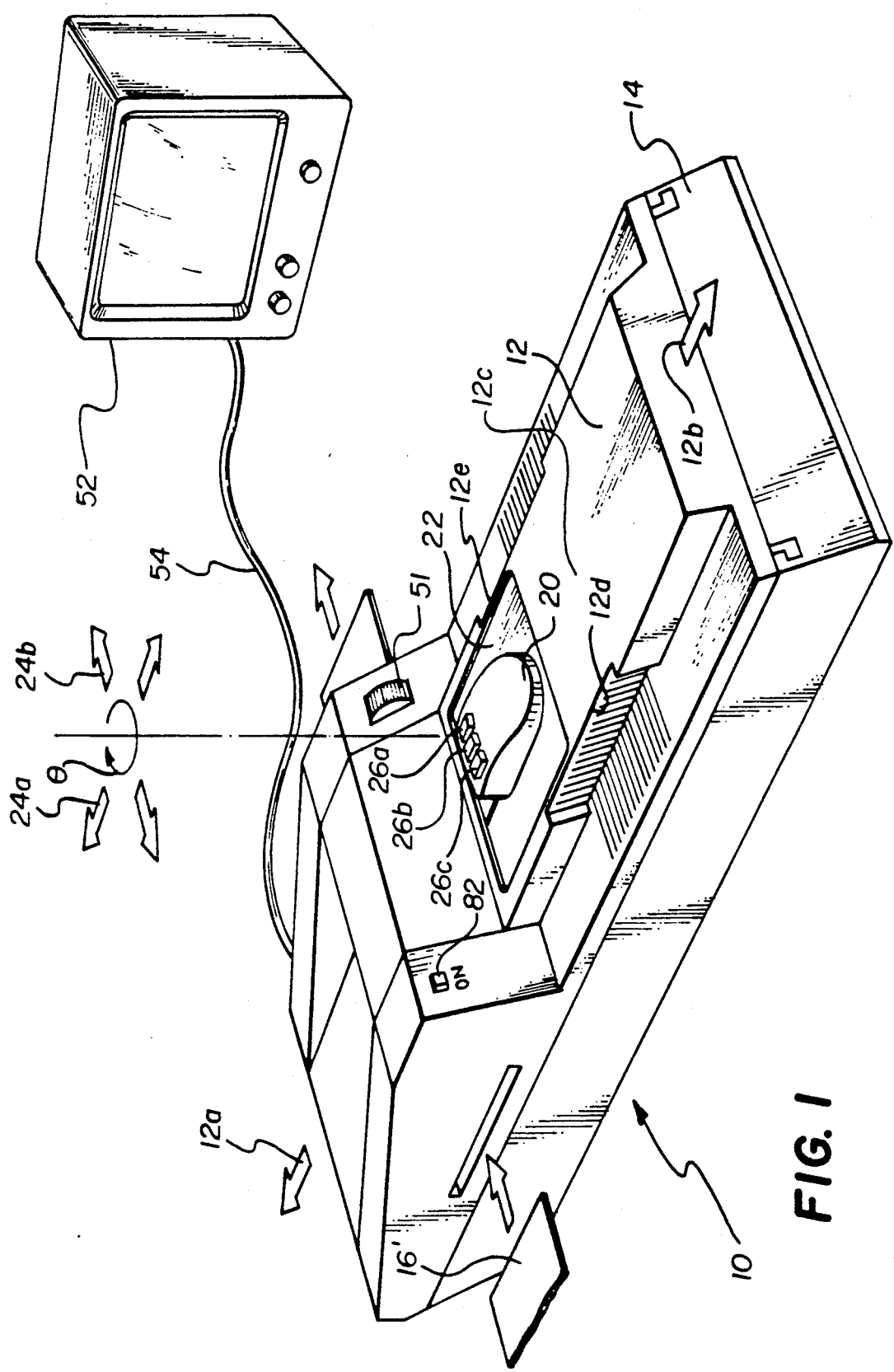
FIG. 1 is a pictorial view of a film scanner, shown in accordance with the invention, that is connected to a television display.
Figure 4:
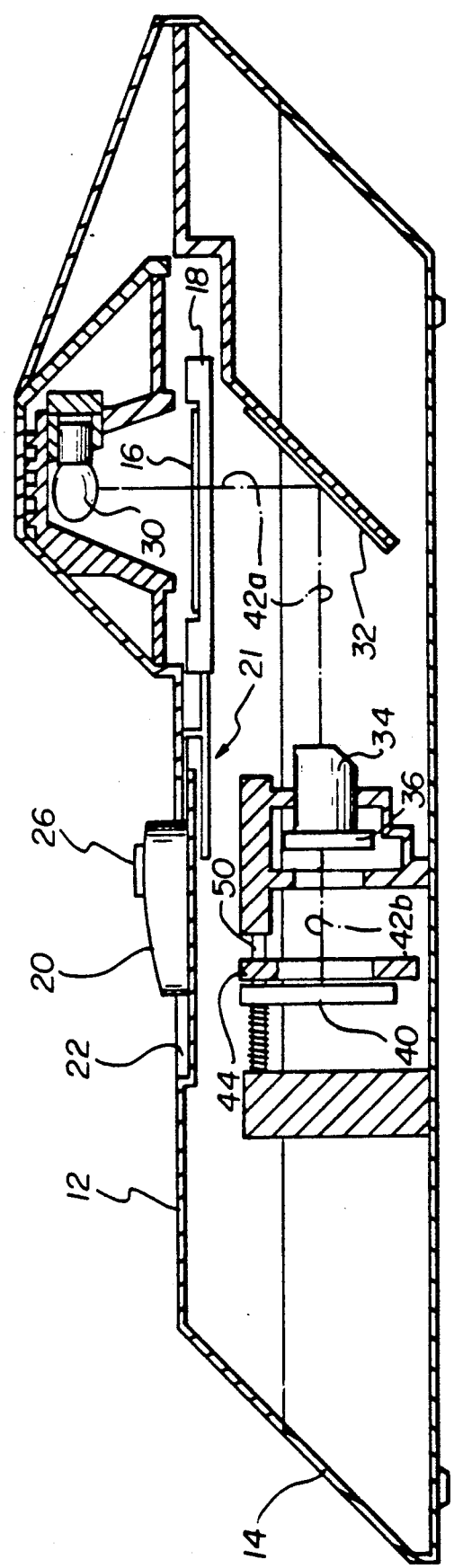
FIG. 4 is a detailed side elevation of the scanner shown in FIG. 1.
Figure 5:
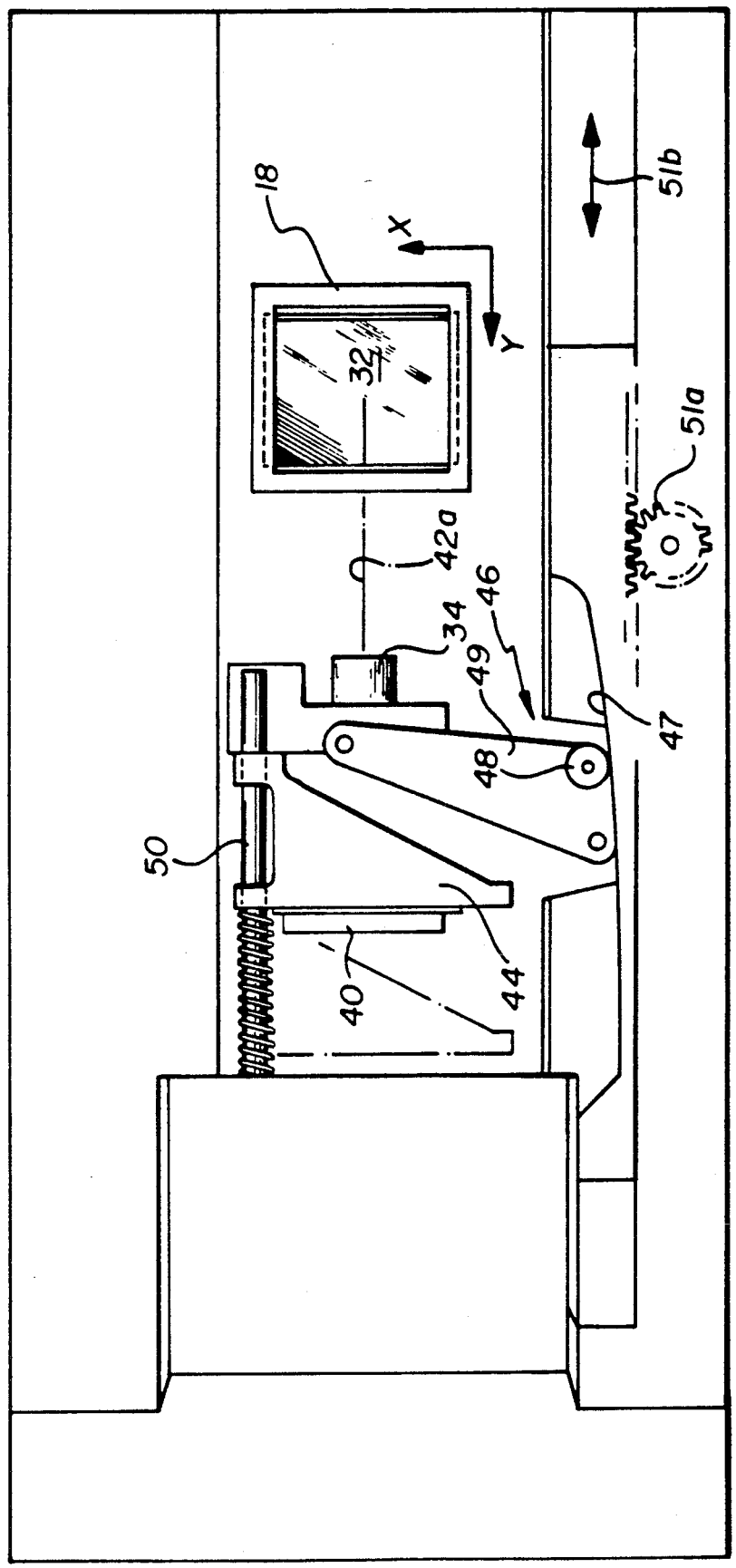
FIG. 5 is a top view of the scanner shown in FIG. 1.

Referring initially to FIGS. 1 through 5, a television-input film scanner 10 is shown according to the invention, including an image composition stage 12 constrained to move relative to a housing 14 in the opposed directions depicted by arrows 12a and 12b in FIG. 1. Movement as depicted effects, as will be shown, a zooming operation. The stage 12 and the housing 14 together enclose an optical system (FIGS. 2-5) for scanning a film image 16 on a filmstrip 16', which is internally supported in the optical system on a film carriage 18 (best shown in FIG. 4). The film carriage 18 is interconnected with a hand-manipulated controller 20 that is movable within limits defined by a sunken space 22 on the stage 12. An area under the controller 20 (not shown) is removed to permit interconnection through a lever arrangement 21 (FIG. 4) between the controller 20 and the film carriage 18. Hand-initiated movements of the controller 20 thereby provide x-y translation of the film carriage 18, and the film 16 therewith, as depicted by the arrows 24a, 24b in FIG. 1 (centered over the controller). The lever arrangement 21 can also permit rotary movement of the film carriage 18 by similar rotation of the controller 20 in a Θ direction. The controller 20 includes three switches 26a, 26b, 26c for controlling light illumination, as will subsequently be described.

FIG. 2 shows the elements of the optical system enclosed by the stage 12 and the housing 14, including an illumination source 30, a mirror 32, a fixed focal length lens 34, and an image sensor 40. The mechanical cooperation between the stage 12 and the housing 14 controls the relative position of the optical components. A preferred mechanism for controlling the position of the optical components is disclosed in copending U.S. Ser. No. 659,336, filed on Mar. 7, 1991, entitled "Device for Converting Light Signals into Video Signal", and assigned to the same assignee as the present invention. Ser. No. 659,336 describes a device in which a lens unit, a sensor, and an object are all supported on separate carriages, any two of which are movable with respect to the others along the optical axis of the device. The positions of the movable elements determine the image and object distances for the imaging of a section of the object on the sensor. The two adjustable elements are connected by a cam mechanism such that, when the image and object distances are adjusted by the cam mechanism, the lens images the zoomed section of the object sharply on the sensor. The cam mechanism described in Ser. No. 659,336 is also incorporated in the aforementioned 35 mm Rapid Film Scanner.

In operation, the optical path positions of the conjugate planes in which the film image 16 (object) and the image sensor 40 (image) of the scanner 10 are located are varied in a complementary manner such that the image distance and the object distance are always in compliance with the lens law ((1/focal distance=(1/image distance) +(1/object distance)). Consequently, the magnification of the film image 16 projected upon the sensor 40 varies in accordance with the optical path length, that is, the position of the conjugate planes. More specifically, the mirror 32 is fixed to the stage 12 (see FIG. 4), and moves therewith, while the lens 34 is fixed to the housing 14. Movement of the stage 12 therefore varies the length of the optical path 42a (object distance) between the film 16 and the lens 34. The sensor 40, as will be shown, is mounted on a carriage 44 (see FIG. 5) that is movably interconnected to the stage 12 so that movement of the stage 12 also varies the length of the optical path 42b (image distance) between the lens 34 and the sensor 40. The shape of a cam 47 maintains the lengths of the optical paths 42a, 42b in accordance with the lens law. Thus, the positions of the film 16 and the enclosed image sensor 40 are maintained in their proper conjugate planes with respect to the lens 34 in order to zoom and crop an image of the film 16 without losing focus.

The relationship between the positions of the sensor 40 and the film carriage 18, as taught by Ser. No. 659,336, is provided in the scanner 10 by a zoom-cam mechanism 46, generally shown in FIG. 5 by the cam surface 47 attached to the stage 12 and a cam follower 48 connected by a bracket 49 for moving the sensor carriage 44 with respect to the lens 34 along a spring loaded cylindrical mounting beam 50 which is attached to the housing 14. Movement of the stage 12 in the directions 12a or 12b (FIG. 1) therefore initiates changes in the optical path components 42a and 42b so that focus is maintained while zooming the image. Initial focus is obtained by adjusting a thumb wheel 51 (FIG. 1), which is connected by gearing (not shown) to a pinion 51a (FIG. 5) for racking the cam 47 back and forth in accordance with the arrow 51b until initial focus is obtained. Thereafter the zoom-cam mechanism 46 maintains focus. The maximum extent of movement of the stage 12 relative to the housing 14 in the course of achieving such zooming is shown in FIG. 3. In addition to zooming, the image may be cropped in x-y directions 24a and 24b (FIG. 1) by moving the controller 20 within the sunken space 22 on the surface of the sled 12, and the image may be rotated in a Θ direction by rotating the controller 20. The relative movements of the stage 12 and the controller 20 are provided from one hand by resting the palm on the area 12a of the stage 12 and draping the thumb and little finger over the edge 12b and 12e while the middle fingers rest over the controller 20. In this manner, pressure from the whole hand moves the stage 12 while the middle fingers independently move the controller 20.

Figure 6:
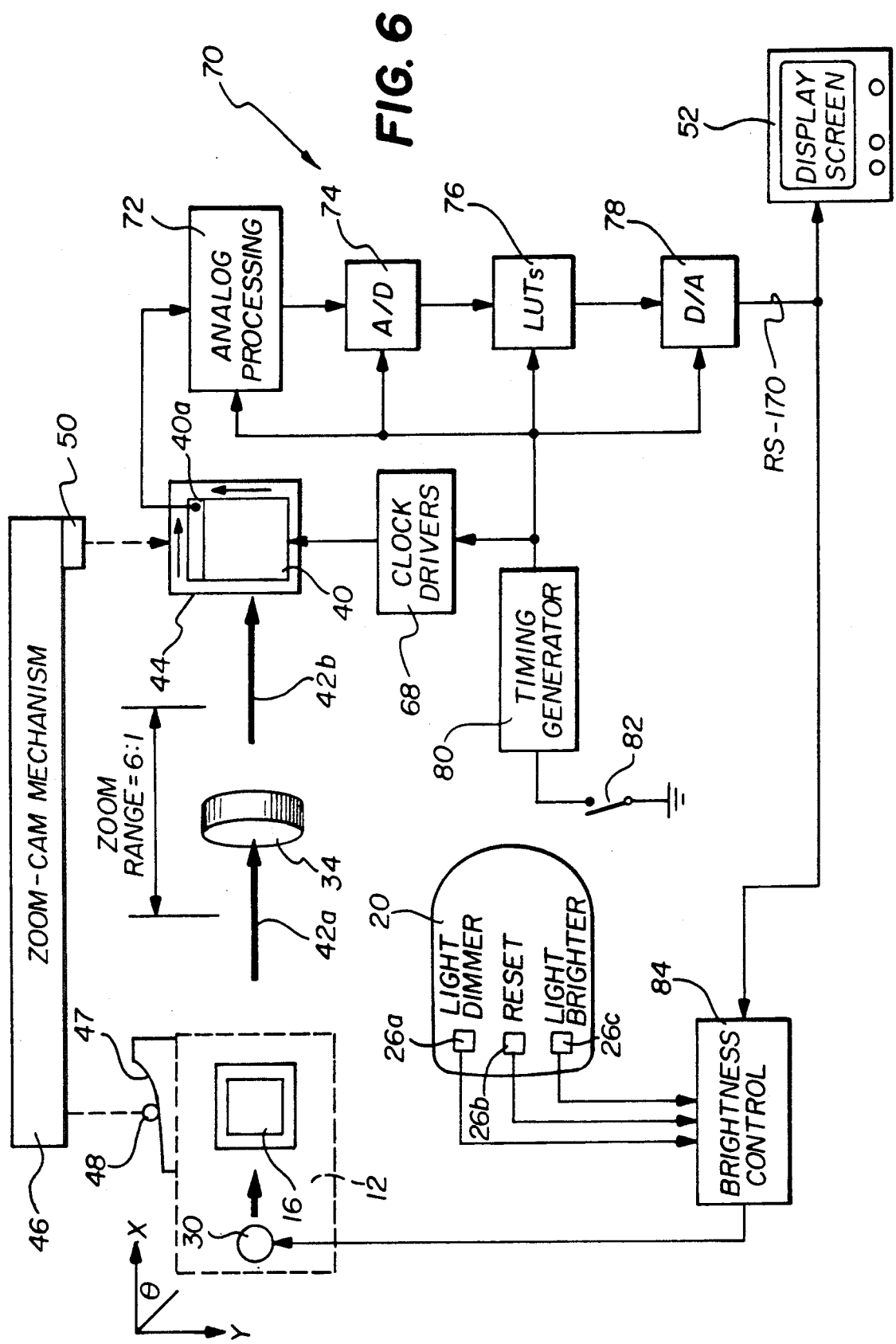
FIG. 6 is a block diagram mainly showing mechanical and electrical components of the film scanner shown in FIG. 1.

Referring particularly to FIG. 1, the output of the scanner 10 is fed to a conventional television 52 via a RS-170 interface. (If additional processing capability or storage is required, a digital output could be coupled via a SCSI interface (not shown) to a computer.) Further detail of the scanner 10 circuitry is shown in FIG. 6 in relation to components already described. The optical section of the scanner includes the aforementioned light source 30, the movable stage 12 for supporting the film 16 in the optical paths 42a and 42b, the lens 34, and the image sensor 40 supported in the mounting bracket 44. A conventional interline transfer image sensor is preferably used, such as Kodak Model KAI-0370. In accordance with the disclosure of Ser. No. 659,336, the stage 12 includes the cam 47 of the zoom-cam mechanism 46, which in turn is coupled by the cam follower 48 to the mounting bracket 44 of the sensor 40 to maintain proper focus. The lens 34 itself is maintained in a fixed position relative to the housing 14. Thus the movable stage 12 changes the (object) distance between the film 16 and the lens 34, thus changing the magnification while the zoom cam mechanism 46 accordingly changes the (image) distance between the sensor 40 and the lens 34 thus maintaining proper conjugate planes for proper focus at the different magnifications. Signals generated by clock drivers 68 drive the image charge line by line to a horizontal register 40a and therefrom to a signal processing section 70.

The signal processing section 70 includes an analog processing circuit 72, an analog-to-digital (A/D) converter 74, a set of look-up tables (LUTs) 76, and a digital-to-analog (D/A) converter 78. The analog processing circuit 72 provides pre-amplification and conventional correlated double sampling of the analog signals. The analog signals are converted into digital image signals by the A/D converter 74 and applied to the LUTs 76, which contain values to allow for user adjustment of the tone scale (contrast and gamma). The tone-adjusted digital signal is converted to an analog signal by the D/A converter 78 and is then connected via a conventional RS-170 interface to the television 52. Timing signals from a timing generator 80 control the processing throughput rate of the signal processing circuit 70, as well as the timing of the clock drivers 68. An on/off switch 82 (also shown in FIG. 1) connected to the timing generator 80 turns the scanner on and off. Once on, the scanner 10 outputs a continuous video signal to the television 52.

In accordance with the invention, an analog output from the D/A converter 78 is provided to a brightness control circuit 84. As the zoom-cam mechanism 46 is manipulated, the magnification of the film 16 upon the sensor 40 is changed and, consequently, the amount of light impinging on the sensor 40 changes. More particularly, as the optical path length 42b decreases and the magnification decreases, the cone angle of the light beam reaching sensor 40 decreases and the image on the television 52 perceptibly dims. Likewise, as the optical path length 42b increases and the magnification increases, more light reaches the sensor 40 and the image on the television 52 perceptibly brightens. To counteract this tendency, the brightness control circuit 84 senses the peak value of the analog signal output to the television 52 and accordingly increases or decreases the amount of illumination provided by the light source 30. That is, illumination increases as magnification increases and decreases as magnification decreases. The brightness control circuit 84 also serves to compensate for film exposure differences of various transparencies which may be inserted in scanner 10. Three switches on the controller 20—a light dimmer switch 26a, a reset switch 26b, and a light brighter switch 26c—provide means to alter the automatic control provided by the brightness control circuit 84 and to manually increase or decrease the illumination. The reset switch 26b essentially cancels any manually-induced brightness change and brings the illumination back to the automatically-set level.

FIG. 1 shows the preferred way of manually setting the illumination level, that is, by actuation of a simple dimmer switch (button) 26a and a similarly simple brightener switch (button) 26b. These switches (along with the reset switch 26c) are mounted on the scanner in a place accessible to a single hand of the user (such as on the controller 20), and in particular where they may be actuated without having to resort to a keyboard or to a cursor device or to any controls on the television display. Preferably, the switches 26a, 26b, 26c are accessible to the same hand that operates the zoom cam mechanism 46 by moving the stage 12.

Figure 7:
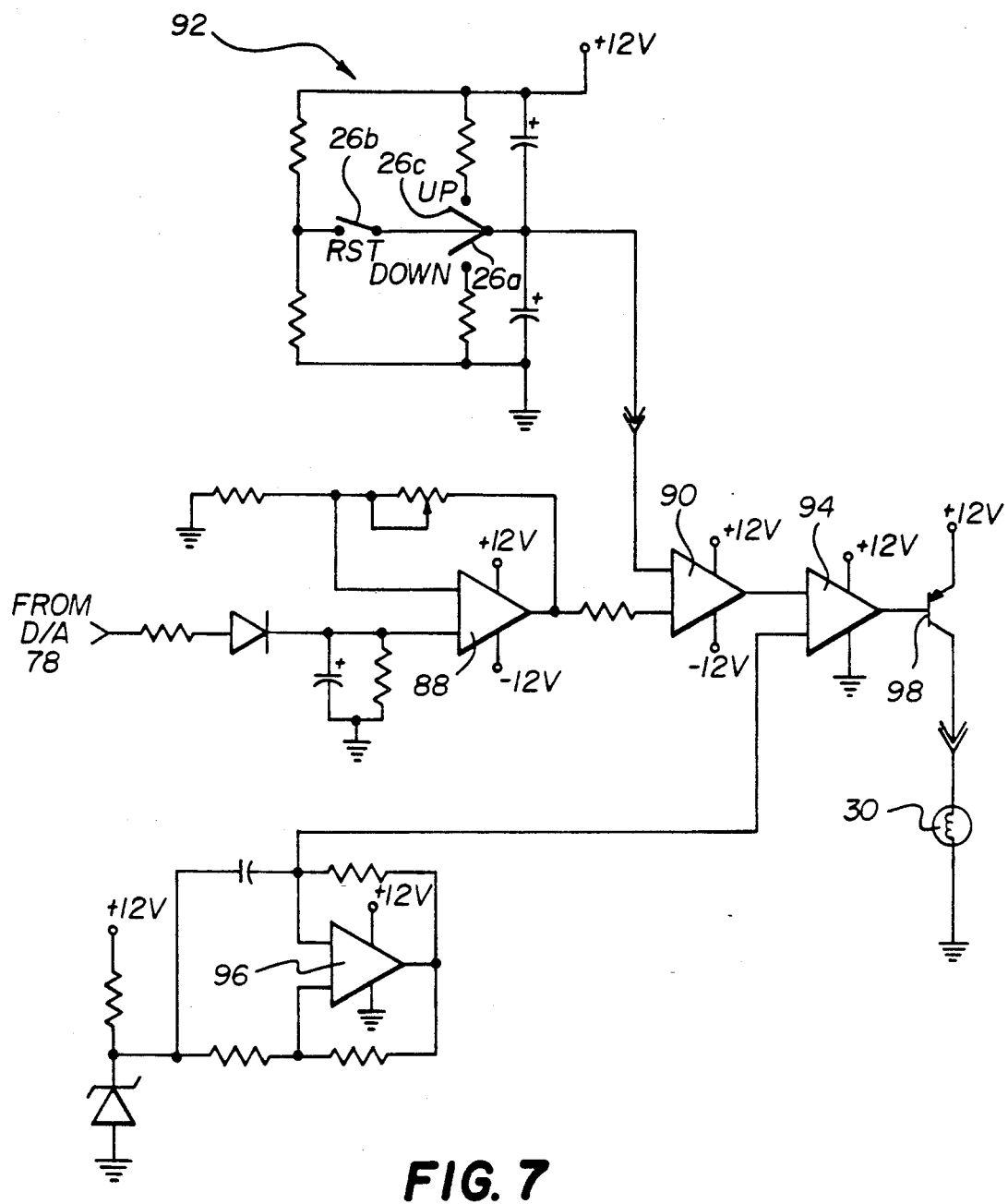
FIG. 7 is a circuit diagram of the brightness control component shown in FIG. 6.

Details of the brightness control circuit 84 are shown in FIG. 7. The output analog signal from the D/A converter 78 is brought into a peak detector circuit 88, which recognizes the peak signal level and holds it. The resultant peak level is applied to a reference level generator 90, which also accepts an input from the alteration circuit 92. The dc level of the reference generator 90 is set to approximately 4 volts by actuating the reset switch 26b. Subsequent actuation of the dimmer switch 26a or the brightener switch 26c changes the dc level applied to the reference generator 90, and accordingly changes the reference level provided by the reference generator 90. A pulse modulator 94 then uses the reference level as a threshold to gate a sawtooth waveform provided by an oscillator 96. The output of the pulse modulator 94 controls the base potential of a transistor 98, which is connected to the bulb 30 so as to turn the bulb on whenever the base conducts. The on time of the bulb 30 is determined by the pulse width of the period the sawtooth waveform exceeds the reference level. Thus varying the reference level, either by changing the peak level from the peak detector 88 or by increasing or decreasing the dc level from the alteration circuit 92, accordingly varies the illumination output of the bulb 30.

The invention has been described in detail with particular reference to preferred embodiments thereof, but it will be understood that variations and modifications can be effected within the spirit and the scope of the invention.

What is claimed is:

1. A user-manipulated scanner useful as an input device for a display, the scanner including sensing means for providing an image signal from a fixed image, means for illuminating the fixed image and thereby generating image light, optical means for directing the image light along a light path toward the sensor, manually operable magnification means for varying the optical path length thereby varying the magnification of the fixed image projected upon the sensor, the improvement wherein the scanner comprises means for automatically controlling the amount of illumination provided by said illuminating means according to the level of the image signal provided by the sensor, and manually operable means for altering said automatic illumination controlling means to accordingly allow additional variation of the illumination level.

2. A scanner as claimed in claim 1 wherein said manually operable magnification means for varying the optical path length and said manually operable altering means are together located on the scanner in a location from which they are together operable by the same hand of the user.

3. A scanner as claimed in claim 2 wherein said manually operable magnification means for varying the optical path length is activated from a hand-movable stage and said manually operable altering means is also located on said hand-movable stage.

4. A scanner as claimed in claim 1 wherein the fixed image is a film transparency.

5. A scanner as claimed in claim 1 wherein said manually operable altering means includes separable light dimming and light brightening switches for respectively lowering and raising the illumination level.

6. A scanner as claimed in claim 5 wherein said manually operable altering means includes a reset switch for cancelling the additional variation of the illumination level imposed by said altering means.

7. A user-manipulated scanner useful as an input device for a display, the scanner including sensing means for providing an image signal from a fixed image, means for illuminating the fixed image and thereby generating image light, optical means for directing the image light along a light path toward the sensor, manually operable magnification means for varying the optical path length thereby varying the magnification of the fixed image projected upon the sensor, the improvement wherein the scanner comprises manually operable means for altering said illuminating means to accordingly allow variation of the illumination level, wherein said manually operable magnification means for varying the optical path length and said manually operable altering means are together located on the scanner in a location from which they are together operable by the same hand of the user.

8. A scanner as claimed in claim 7 wherein said manually operable magnification means for varying the optical path length is activated from a hand-movable stage and said manually operable altering means is also located on said hand-movable stage.

9. A scanner as claimed in claim 7 wherein the fixed image is a film transparency.

10. A scanner as claimed in claim 7 wherein said manually operable altering means includes separable light dimming and light brightening switches for respectively lowering and raising the illumination level.

* * * * *